United States Patent
Bryczkowski et al.

(10) Patent No.: US 12,236,157 B2
(45) Date of Patent: Feb. 25, 2025

(54) SYSTEM AND METHODS FOR AUTOMATED COLLECTION, AGGREGATION, DISTRIBUTION, DISPLAY, AND RECORDING OF ALERT RELATED INFORMATION

(71) Applicant: Activu Corporation, Rockaway, NJ (US)

(72) Inventors: Krzysztof Bryczkowski, Bridgewater, NJ (US); Ovidiu Dascalu, Metuchen, NJ (US); Paul Noble, Short Hills, NJ (US)

(73) Assignee: Activu Corporation, Rockaway, NJ (US)

( * ) Notice: Subject to any disclaimer, the term of this patent is extended or adjusted under 35 U.S.C. 154(b) by 0 days.

(21) Appl. No.: 18/498,648

(22) Filed: Oct. 31, 2023

(65) Prior Publication Data
US 2024/0061638 A1 Feb. 22, 2024

Related U.S. Application Data

(63) Continuation-in-part of application No. 17/651,567, filed on Feb. 17, 2022, now Pat. No. 11,822,852.
(Continued)

(51) Int. Cl.
*G06F 3/14* (2006.01)
*G06F 16/44* (2019.01)
*H04L 41/0604* (2022.01)

(52) U.S. Cl.
CPC .......... *G06F 3/1454* (2013.01); *G06F 3/1446* (2013.01); *G06F 16/44* (2019.01); *H04L 41/0604* (2013.01)

(58) Field of Classification Search
CPC ............ G06F 3/1446; G09G 2300/026; G09F 9/3026; H04N 9/3147; F24F 11/30; H04L 67/025; H04L 67/54; H04L 63/1408; G21C 17/00; G08G 1/20; A61B 5/002; H04W 24/00
See application file for complete search history.

(56) References Cited

U.S. PATENT DOCUMENTS

| 2016/0162247 A1* | 6/2016 | Bryczkowski | ...... G06F 11/3003 345/1.3 |
| 2016/0266861 A1* | 9/2016 | Kim | ...................... H04N 9/3147 |
| 2018/0140957 A1* | 5/2018 | Woodcock | ............... A63G 1/10 |

* cited by examiner

*Primary Examiner* — Koosha Sharifi-Tafreshi
(74) *Attorney, Agent, or Firm* — Benesch Friedlander Coplan & Aronoff LLP

(57) ABSTRACT

Disclosed herein is a system for handling critical incidents from external control, information and networking systems. In one embodiment, the system includes a mapping module, a presentation formatting module, a distribution module, and a least one display device. The mapping module is configured to receive alert information from external systems, search for information relevant to the critical incident, and aggregate the alert information and relevant information into a persistent arrangement that maps the source of such information. The presentation formatting module is configured to define a visual data presentation that allows for displaying alert information and relevant information in a useful format. The distribution module is configured to send the visual data presentation to one or more end-points. The display device(s) is located at such an end-point(s) and configured to receive and display the visual data presentation to personnel responsible for mitigating and curing the critical incident.

20 Claims, 3 Drawing Sheets

Related U.S. Application Data

(60) Provisional application No. 63/161,529, filed on Mar. 16, 2021.

SYSTEM AND METHODS FOR AUTOMATED COLLECTION, AGGREGATION, DISTRIBUTION, DISPLAY, AND RECORDING OF ALERT RELATED INFORMATION

CROSS-REFERENCE TO RELATED APPLICATIONS

This application is a continuation-in-part of U.S. patent application Ser. No. 17/651,567 titled "System and Method for Automatic Collection, Aggregation, Distribution, and Display of Alert Related Information," filed on Feb. 17, 2022, which claims priority to U.S. Provisional Patent Application No. 63/161,529 titled "System and Method for Automatic Collection, Aggregation, Distribution, and Display of Alert Related Information," filed on Mar. 16, 2021, the disclosures of these patent application being incorporated herein by reference in their entirety.

FIELD OF INVENTION

The present disclosure relates to the field of automated alerts generated by monitoring applications in communication with a communication method and arranged to monitor hardware and software for occurrences of critical incidents. More particularly, the present disclosure relates to a system and method for facilitating the collection of alert data for a critical incident; gathering and aggregating additional information relevant to the critical incident, including visual information; and distributing and displaying such critical incident alert data and relevant information to multiple disparate display devices in communication with the communication method to efficiently inform and facilitate collaboration between individuals responsible for the critical incident.

BACKGROUND

It is known that systems and dedicated software applications can generate alarm or alert trigger events corresponding to critical states of operation or failure of system functionality and/or system components. Alarm and alert conditions can manifest as any type of information sent by an application over a communication method, such as an internet protocol network with protocols including http notifications, events, incidents, SNMP traps, emails, or SMS messages. Some systems can send alerts via different connectivity equipment and methods such as serial cables using RS-232/432 protocols or other such known connectivity equipment and methods. The purpose of sending alerts over a communication method is to alert personnel responsible for mitigating and/or correcting the issues underlying the alert. However, known systems and methods for generating alarm and alert trigger events are limited in that they are not sufficiently automated or integrated to efficiently gather all available relevant information in real-time and deliver such information to the personnel responsible for correcting or mitigating the underlying failure. Thus, known systems and methods fail to provide the responsible personnel with the best and most complete information regarding the alert, which limits the ability to correctly and timely address the underlying failure that generated the alarm or alert.

There is a need for systems and methods that provide organizational teams tasked with managing and correcting critical incidents with alignment and coordination with relevant business resources and operational objectives required for efficient resolution to critical incidents. Additionally, there is a need for systems and methods capable of managing alert information transmitted in various formats and various communication methods. Described herein are novel methods and systems that facilitate automated, real-time, non-human-input-based distribution of critical incident data and relevant information, including visual information, to maintain situational awareness and for the purpose of improving the timeliness and effectiveness of responses to such critical incidents.

SUMMARY

Disclosed herein are systems and methods for efficiently managing critical incidents in a timely and efficient manner. Such systems and methods provide for the detection of alert information describing a critical incident for an external computer or networking system, the standardization of such alert information, the collection and aggregation of additional information relevant to the critical incident, the formatting of alert information and additional relevant information for efficient visual display, and the distribution of the alert information and additional relevant information for display on disparate display devices accessible to personnel responsible for mitigating and curing the critical incident. Additionally, the systems and methods can provide for collaboration between responsible personnel to resolve the critical incident and the recording and documenting of actions taken by the systems and/or users of the systems during applicable methods for subsequent review and analysis.

In one embodiment, a system includes a mapping module, a presentation formatting module, a distribution module, and at least one display device. The mapping module is configured to receive alert information from an external system, search for additional information relevant to the critical incident, and aggregate the alert information and relevant information into a persistent arrangement that maps the source of such information. The presentation formatting module is configured to define a visual data presentation that arranges lists of visual sources in a format that is useful for displaying visual depictions of alert information and relevant information. The distribution module is configured to send the visual data presentation to one or more end-points. The display device(s) is located at such an end-point and configured to receive and display the visual data presentation.

Examples of display devices include, for example, a video wall display, personal computer devices such as desktop and laptop computers, and mobile devices such as smartphones and tablets. Such display devices are typically accessible to personnel responsible for mitigating or curing the critical incident. The system can additionally include collaboration tools that allow personnel viewing the visual data presentation to provide analysis and commentary or present questions to other personnel concurrently viewing the visual data presentation. Such collaboration can include adding content via a graphical whiteboard, text messages, and audio communications. The system can further be arranged to include a recording module that records and stores the visual data presentation and any systematic revisions to the visual data presentation along with all content contributed by personnel through the collaboration process.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
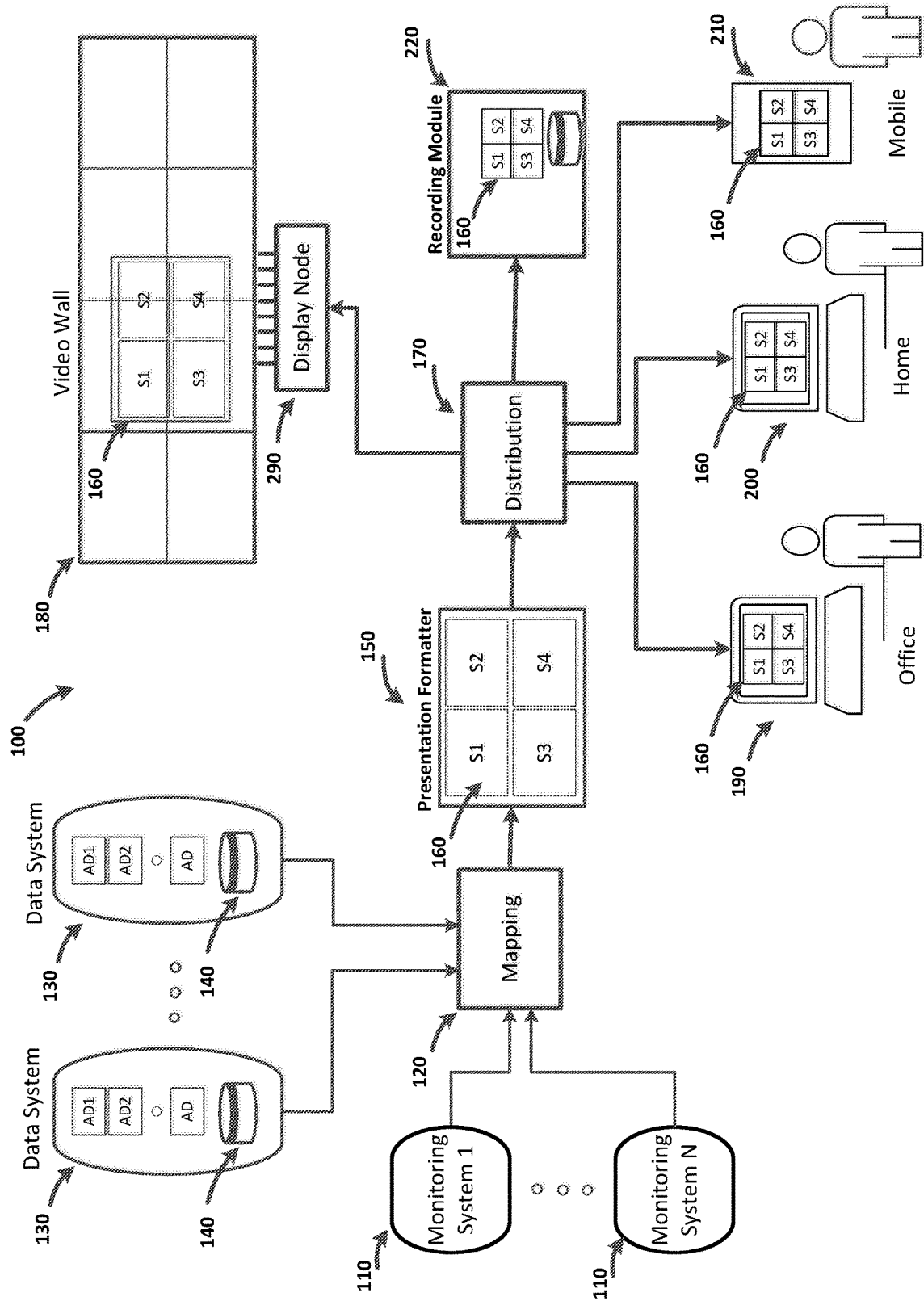
FIG. 1 schematically illustrates an overall system structure disclosed herein.

The apparatus, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, methods, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for facilitating the management and handling of critical incidents are hereinafter disclosed and described in detail with reference made to FIGS. 1-3.

Generally, novel methods and systems disclosed herein are directed to automated systems that provide useful and relevant information in a timely manner for addressing failures in computer and networking systems. Such novel methods may be performed on novel systems that comprise one or more computing devices as described herein. Such a novel methods and system are useful in addressing incidents such as, for example, failure or faulty performance of hardware or software components of a computer or networking system; acts such as a breach of computer systems by unauthorized third parties for malicious purposes; external occurrences such as power outages, loss of critical third-party services, fire, natural disasters, and physical intrusion; and other such noteworthy incidents (i.e., a "critical incident"). Such critical incidents generate alerts that are tracked and managed by the novel methods and systems disclosed herein to successfully cure, mitigate, or otherwise address the critical incident through the collection, aggregation, distribution, and display of alert information and additional relevant information to personnel dedicated to monitoring and correcting such critical incidents (such personnel shall be referred to herein as "response team").

As will be discussed in detail herein, such novel methods and systems include a number of computing devices and other such physical components, software components, and processes useful in collecting and aggregating disparate information and data relevant to a critical incident and distributing such information and data to a decentralized response team to analyze, address, mitigate, and/or cure the critical incident. The methods and systems disclosed herein provide such data and information regarding a critical incident in a format and data structure that can be displayed at various physical locations and on a variety of display devices, such as, for example, a video wall display, personal computers, mobile devices, and the like, so that the response team can efficiently and accurately access and analyze the critical incident, form an action plan, and execute that action plan to correct or mitigate the critical incident.

The methods and systems disclosed herein further provide recording functionality so that a record is created for the critical incident that includes the data and information gathered with regard to the critical incident and the response teams' responsive actions. Such a recording can be useful, for example, as a teaching tool for new members of the response team, to improve the system and performance of the response team through post-event analysis, and for archival purposes.

The methods and systems disclosed herein further provide collaboration tools that offer the response team the functionality necessary to efficiently communicate with decentralized personnel to convey analyses, ideas, questions, and other information useful in addressing, mitigating, and/or curing the critical incident. An example of such a collaboration tool is whiteboarding functionality, where a member of the response team can add content to the displayed information that can be immediately viewed by all members of the response team. Additional collaboration tools include instant text messaging, audio communications, and the like. The collaboration tools also allow a member of the response team to share all or a portion of the displayed information with personnel outside the response team to gain access to specific expertise and additional opinions to address the critical incident.

Embodiments disclosed herein may be in the form of a method or system, where the method or system relies on one or more physical components (i.e., computing devices or other such hardware) and/or one or more software programs (including firmware, resident software, etc.). In certain embodiments, software programs may reside on a computer-usable storage medium having computer-usable program code embodied in the medium. Embodiments described herein may rely on the general arrangement of computing devices, software, or a combination of computing devices and software programs. Such arrangements are generally referred to collectively as a "system" or individually as a "module."

For methods and systems described herein, any suitable computer usable or computer readable medium (or media) may be implemented. Such computer usable or computer readable media may be computer readable signal media or a computer readable storage media typically used with a computing device. For example, computer usable or computer readable media may include the following: a hard disk drive, a random access memory (RAM), a read-only memory (ROM), an erasable programmable read-only memory (EPROM or Flash memory), an optical fiber, a static random access memory (SRAM), or a magnetic storage device. In essence, the computer usable or computer readable media can be any suitable medium upon which a software program or other such code can be stored, scanned, compiled, interpreted, or otherwise processed in a useful manner and then stored in a computer memory. In the context of this disclosure, computer usable or computer readable media may be any tangible medium that can contain or store a software program for use by or in connection with the instruction execution system, apparatus, or device.

In certain embodiments, a computer readable signal medium may include a propagated data signal with computer readable program code embodied therein, for example, in baseband or as part of a carrier wave. In certain embodiments, such a propagated signal may take any of a variety of forms, including, but not limited to, electro-magnetic, optical, or any suitable combination thereof. In certain embodiments, the computer readable program code may be transmitted using any appropriate medium, including but not limited to the internet, wireline, optical fiber cable, RF, etc. In certain embodiments, a computer readable signal medium may be any computer readable medium that is not a computer readable storage medium and that can communicate, propagate, or transport a program for use by or in connection with an instruction execution system, apparatus, or device.

Embodiment of methods and systems as described herein may be implemented by executable software programs that include software programing instructions for implementing specific logical functions or acts that are provided to and executed on a processor of a general purpose computer, special purpose computer, or other programmable data processing computing device, such that the software programing instructions, implement one or more of the specific functions or acts. In certain embodiments described herein, such software programing instructions may also be stored on a computer-readable memory that can direct a general purpose or special purpose computer or other programmable data processing computing device to function in a particular manner, such that the instructions stored in the computer-readable memory produce specific functions or actions. In certain embodiments disclosed herein, software programing instructions may also be loaded onto a computer or other programmable data processing computing device to cause a series of operational steps to be performed on the computer or other programmable computing device to produce a computer implemented process such that the instructions that execute on the computer or other programmable computing device provide steps for implementing specified functions or acts.

Computing devices useful for embodiments of systems and methods disclosed herein may be connected to a network such as the Internet, a local area network, or an, or any other communication network. Examples of computing devices include, but are not limited to a server computer, a personal computer, a laptop computer, mobile computing device, a series of server computers, a mainframe computer, a computing cloud, a storage system (e.g., a network attached storage (NAS) system, a storage area network (SAN)), or other personalized type of computing device. A SAN may include one or more client electronic devices, including a RAID device and a NAS system. In certain embodiments a computing device may be a physical or virtual device, and may be any device capable of performing operations, such as a dedicated processor, a portion of a processor, a virtual processor, a portion of a virtual processor, portion of a virtual device, or a virtual device. In certain embodiments, a processor may be a physical processor or a virtual processor. A virtual processor may correspond to one or more parts of one or more physical processors. The instructions or logic may be distributed and executed across one or more processors, virtual or physical, to execute the instructions or logic. Computing devices may execute an operating system, for example, but not limited to, Microsoft Windows or Microsoft Windows mobile; Mac OS; Red Hat Linux; Chrome OS; Blackberry OS; Fire OS; a custom operating system; or other such operating systems.

For certain embodiments disclosed herein, computing devices may include a data store or data system, such as a database. Databases for use herein can be relational databases, object-oriented databases, triplestore databases, and the like. Databases may be located within any suitable memory location, such as a storage device coupled to the computing device. In certain embodiments, data, metadata, information, and the like described herein may be stored in the data store or data system. In certain embodiments, the computing device may utilize any known database management system to provide multi-user access to one or more databases. In certain embodiments, the data store or data system may be a custom database, such as, for example, a flat file database or an XML database. In certain embodiments, other forms of a data storage structure and/or organization may also be used. In certain embodiments, data stores or data systems may be, in whole or in part, distributed in a cloud computing arrangement. Computing devices and data stores or data systems may include multiple devices that are distributed throughout a communications network.

Generally, novel systems and methods as disclosed herein include some or all of the following components and functionality: functionality embedded in one or more external systems or computing devices to generate alert information in response to a critical incident; one or more data systems that store information and data relevant to critical incidents; a mapping module that can receive and combine the alert information and results from queries of the data systems relevant to the critical incident; a presentation formatting module that organizes the visual data and information in a format that is useful across different display hardware; a distribution module to distribute the data and information to such different display hardware; display hardware such as a video wall display, personal computers, and mobile devices; a recording module; collaboration tools that provide for members of the response team to add comments and content regarding the critical incident; and functionality for sharing information with people outside the response team, all of which are interconnected by a communication method. For the purposes of this disclosure, methods, systems, modules, functionality, data systems, display devices, and tools disclosed herein may be in the form of computing devices, software programs, software programing instructions, data stores, data systems, or combination thereof described herein.

For the purposes of this disclosure, a communication method can be any arrangement of computing devices, software programs, or other such hardware and software that provides for electronic communication between components of a system, including, but not limited to, RS-232/432 protocols, local-area networks, wireless local-area networks, wide-area networks, virtual private networks, and combinations thereof, using any number of known protocols.

An exemplary critical incident alert system 100 is schematically illustrated in FIG. 1. The critical incident alert system 100 can be arranged to monitor any number of external computer systems and networking systems located at any number of geographically disparate locations. For example, a manufacturing company can arrange such a critical incident alert system 100 to monitor its computer and networking systems located at a dozen manufacturing plants spread across a dozen geographic regions. Each of these manufacturing plants can include hardware and/or software components that comprise a monitoring system 110 that actively monitors any number of relevant computer and networking systems at the specific manufacturing plant. Such monitoring systems 110 can be integral into the computer or networking system it is monitoring. Upon the occurrence of a critical incident, the applicable monitoring system 110 senses the critical incident and collects and/or generates data and information regarding the critical incident (i.e., "alert information"). The applicable monitoring system 110 is arranged to send such alert information over a communication method to additional components of the critical incident alert system 100 for further processing and analysis.

In one arrangement, the alert information is sent to a mapping module 120. The mapping module 120 is arranged such that it receives the alert information from the applicable monitoring system 110, analyzes the alert information, and determines the nature of the critical incident(s). In one embodiment, the mapping module 120 comprises a computing device, a software program, a data store, or multiples thereof or combinations thereof. Once the nature of the critical incident is determined, the mapping module 120 communicates with one or more applicable data systems 130 to conduct and perform searches for information relevant to the applicable critical incident. Each data system 130 includes one or more databases 140 that organize and store such additional data. The data and information in such data systems 130 can include, for example, visual data such as graphical data, dashboards, tabular data, video streams from surveillance cameras, news reports, weather broadcasts and data, maps, photographs, video clips, webpages, and social media posts. Such data systems 130 and databases 140 are often external to the critical incident alert system 100 and can include public databases and databases accessible via subscription services. Once such searches of the databases 140 are completed, data and information relevant to the applicable critical incident is sent to the mapping module 120. In one embodiment, the data systems 130 may be incorporated into a computing device that includes software programs.

Once the mapping module 120 gathers all relevant data and information from searches of the data systems 130, the mapping module 120 groups all information gathered into a useful format and data structure that maps the alert information and additional relevant information to the source of such information. The mapping module 120 then sends the aggregated information to a presentation formatting module 150, where all information is formatted into a visual data presentation 160 that is arranged to be effectively visually displayed at end-points. As used herein, the term "end-points" refers to the location of a display device (at which a response team member can view the visual data presentation) or a recording device that will utilize the visual data presentation 160. As will be understood, the visual data presentation 160 is arranged so that the response team can efficiently understand the nature of the critical incident and the known circumstances so that the response team can quickly develop a plan to respond to the critical incident. In one example, metadata gathered by the system can be displayed to users of the system as text within the visual data presentation if it is the type of information that is useful to the response team. The functionality of the mapping module 120 is further discussed herein below with reference to FIG. 2.

Visual data in the presentation formatting module 150 is formatted in a visual data presentation 160, which is to say that the visual data is defined as a standardized, persistent data structure that is useful for various purposes. A visual data presentation 160 can be consistently displayed on any number of different display hardware, such as a video wall display, personal computers, and mobile devices. As will be understood, such a visual data presentation 160 delivers a consistent visual presentation to each of the response team members, which allows the response team to coordinate their efforts even if each member is in a different location and using different display hardware. In one embodiment, the presentation formatting module 150 comprises a computing device, a software program, a data store, or multiples thereof or combinations thereof.

The visual data presentation 160 is distributed over one or more communication methods to various rendering end-points via a distribution module 170. As previously discussed and schematically illustrated in FIG. 1, examples of such end-points include video wall displays 180, which can be used in a centralized location where multiple members of the response team may be located; personal computing devices, such as office computers 190 and home computers 200, for response team members that are located in various offices or working remotely from home; and mobile devices 210, for response team members that are away from the office, but need to quickly react to the critical incident; and a recording system 220. In one embodiment, the distribution module 170 comprises a computing device, a software program, a data store, or multiples thereof or combinations thereof. In one embodiment, the recording system 220 comprises a computing device, a software program, a data store, or multiples thereof or combinations thereof.

The visual data presentation 160 is arranged and distributed such that the visual data presentation 160 can be interactive in nature through the use of collaborative tools such as whiteboard functionality, text communication, and voice communication. Such collaboration allows disparately located response team members to efficiently share ideas, formulate a response plan, and execute upon that response plan in the form of visual and audio content. The interactive functionality and collaborative tools described herein can be implemented using a computing device, a software program, a data store, or multiples thereof or combinations thereof.

Figure 2:
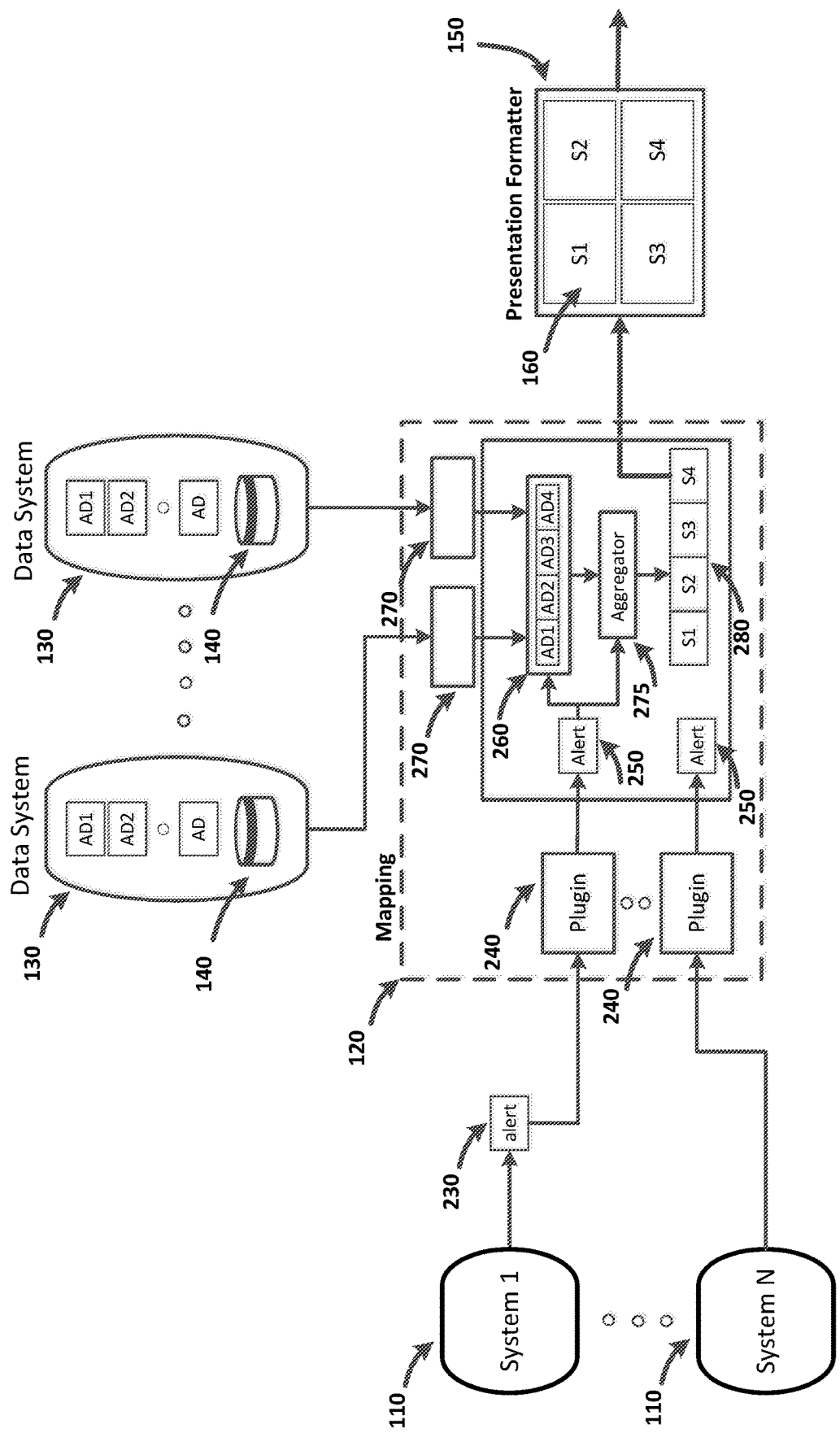
FIG. 2 schematically illustrates a portion of the system structure of FIG. 1, namely a mapping module and related components of the overall system.

With reference to FIG. 2, for each critical incident occurring to a monitored computer or networking system, an alert information packet 230 is generated. Because the monitoring systems 110 are not uniform and consistent, the alert information packet 230 can manifest as any type of information that can be sent via a communication method. For example, IP based protocols such as http notifications, events, incidents, SNMP traps, emails and SMS messages can be used. In addition, monitoring systems 110 can transmit alert information packets 230 over different connectivity media such as, for example, serial cables using RS-232/432 protocols. If not accounted for, such variability in the performance of the monitoring systems 110 can result in omission of available visual data related to an applicable critical incident due to the use of different communication methods and formats. The novel system and method disclosed herein is arranged to manage alert information packets even when disparate monitoring systems 110 send alert information packets 230 using different formats and different communication methods.

In order to handle different communication methods and different formats of alert information packets 230 coming from various external monitoring systems 110, the mapping module 120 includes multiple plugin input components 240 (two such plugin input components are illustrated on FIG. 2). Each plugin input component 240 is dedicated to and manages communication with specific monitoring systems 110. Such plugin input components 240 are arranged to use a particular communication method protocol or method to communicate with a specific type of monitoring system 110 to receive alert information packets 230 or to proactively retrieve alert information packets 230 from specific types of monitoring systems 110. Plugin input components 240 can also define and expose specific interfaces to communication with the critical incident alert system 100. In certain circumstances, when monitoring systems 110 are not arranged to send alert information packets to the critical incident alert system 100, a plugin input component 240 can be arranged to retrieve external data and information and search for applicable alert information packets 230.

The plugin input components 240 manage the alert information packet 230, as required, to generate a standardized alert 250 that can be consistently handled by the critical incident alert system 100. The standardized alert 250 includes the alert information and applicable metadata. A search component 260 within the mapping module 120 is arranged to conduct searches using standardized alerts 250. The search component 260 uses the alert information and metadata of the standardized alert 250 to conduct searches of the various databases 140 within the data systems 130. The search component 260 utilizes artificial intelligence (AI) algorithms and systems to identify various data systems 130 for searching and to formulate appropriate queries for those systems. As previously noted, such searches identify and retrieve data and information, including visual data, that is relevant to the applicable critical incident. The mapping module 120 includes communication components 270 arranged to interact with the data systems 130 to retrieve such relevant data and information from the applicable databases 140 using standards and protocols specific to the applicable data systems 130. In one example, a communication component 270 is arranged to connect to and interact with an external data system 130 that is a video management system (VMS) to search databases 140 in the VMS for video streams from specific cameras based on the geo-position metadata in the standardized alert 250. In another example, a communication component 270 is arranged to connect and interact with an external artificial intelligence system Once the relevant data and information is retrieved from data systems 130, the retrieved data (represented by AD1-AD4 in FIG. 2) is temporarily stored in the search component 260. An aggregating component 275 within the mapping module 120 then processes the information within the standardized alert 250 and the retrieved relevant data and information 260 to map each portion of information to its respective visual sources (represented by S1-S4 in the Figures) and stores the information and applicable mapping in a visual sources storage component 280 in a persistent arrangement that maps the source of such information. These mapped sources are then sent to the formatting module 150 and used to create the visual data presentation 160 arranged in the presentation formatting module 150, which presents data and information relevant to the critical incident in an organized and useful format. One example of a visual data presentation 160 is a matrix made up of visual sources (the visual data presentation 160 in FIGS. 1 and 2 is exemplarily illustrated as a 2×2 matrix). In one exemplary embodiment, such a matrix presentation can include a first visual segment displaying dashboard graphical data rendered in the browser, a second visual segment displaying a satellite image, a third visual segment displaying a surveillance video camera livestreams, and a fourth visual segment displaying a live view of specific application screens.

The visual data presentation 160 can be formatted and arranged in the presentation formatting module 150 by defining source data type, source location, and size defined in visual pixel space. In such an arrangement, the visual data presentation 160 can be viewably rendered on any display device located at an end-point such as a video wall display 180, a monitor of an office 190 or home 200 computer, a screen of a mobile device 210, or recording system 220. The various visual sources (visual segments) contained in the visual data presentation 160 are defined to accommodate a certain visual data presentation overall pixel size. It includes source number, location, size, aspect ratio, visual quality, etc.

The distribution module 170 includes functionality for sending the video data presentation 160 to various end-points so that the visual data presentation 160 can be rendered uniformly on a variety of display devices. As will be appreciated, rendering of the visual data presentation 160 is specific to each targeted end-point and the arrangement of the visual data presentation 160 is different for each specific display device associated with a targeted end-point. For example, a video wall display 180 is controlled by a display node 290. Thus, the distribution module 170 arranges the visual data presentation 160 to be rendered on the video wall display 180 via the display node 290. Similarly, the distribution module 170 appropriately prepares the visual data presentation 160 to be properly rendered on other end-points such as personal computers 190, 200, mobile devices 210, and recording module 220.

A video wall display 180, also referred to as video wall system or video wall application, consist of multiple displays (i.e., monitors) controlled by the display nodes 290. The monitors are typically arranged in an array, where the monitors are controlled to function as a single video display with total number of available pixels that far exceeds what is available on single display. The display node 290 is arranged to receive definition and automatically render one or multiple visual data presentations 160 on the array of monitors. Location and size of that visual data presentation 160 is limited only by the number of pixels available on the video wall display 180 and the arrangement of the visual data presentation 160 by the distribution module 170.

The distribution module 170 is also arranged to send notifications to the various end-points to notify members of the response team that information regarding a critical incident is available. Such notifications can be generated automatically by the distribution module 170 as soon as the visual data presentation 160 is formatted and ready for distribution to the end-points. Notifications include the definition of the visual data presentation 160 that corresponds to the standardized alert 250. After receiving a notification, a member of the response team can actively render (i.e., open and view) the visual data presentation 160 on a preferred display device or any available display device and directly view the visual information relevant to the critical incident.

Additionally, the critical incident alert system 100 provides interactive, visual collaboration methods that allow each member of the response team to share the visual data presentation 160 with other personnel or organizations available via any communication method. Such sharing includes redistribution of a visual data presentation 160, so that such other personnel can render a visual data presentation 160 separately on a chosen display device, or by sharing only a part of the response team member's screen so as to share only relevant portions of the visual data presentation 160 with the additional personnel. Certain methods allow for collaboration by adding, removing, and interacting with the visual content displayed, along with adding, removing, and interaction with audio content. Other methods allow sharing of the visual data presentation 160 with personnel that do not have access to or the ability to render visual data presentation 160. Collaboration sessions can include whiteboarding over visual content, text messages, and audio communication between response team members. Such additional visual and audio content can be captured and stored by the system 100 for subsequent distribution or retrieval. In addition, "read only" visual data presentations 160 can be shared outside the response team as a published alert rendered in a webpage.

The recording module 220 is arranged to continuously record the visual data presentation 160 as arranged in the presentation formatting module 150 (and any systematic modifications to the visual date presentation 160 over time) and all actions taken by the response team during all collaboration sessions, including modifying, adding, and editing information, voice communication, text communication, and whiteboard drawing. Such recordings are indexed by critical incident and can be analyzed and reviewed for training and for forming action plans to improve responses to critical incidents.

Figure 3:
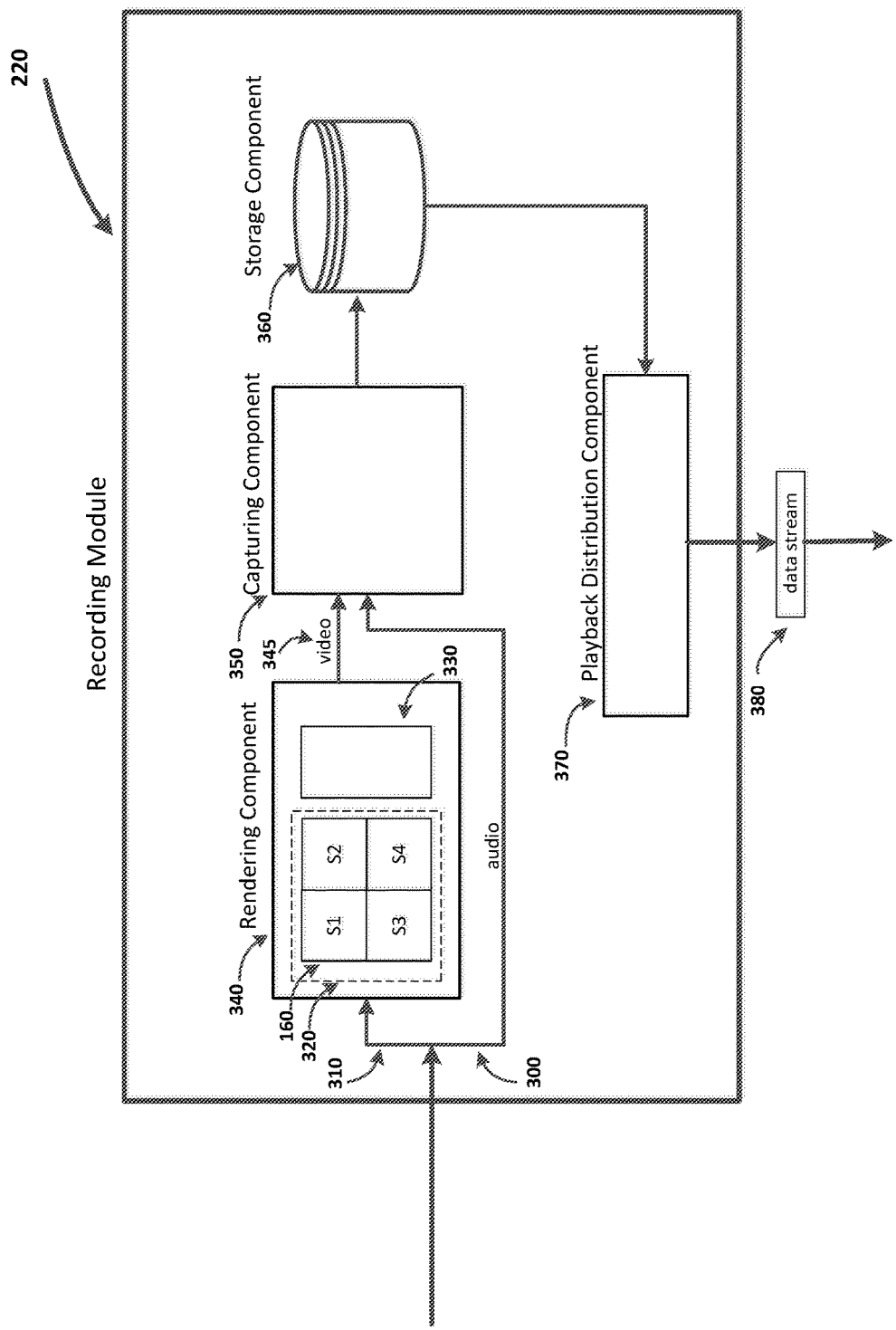
FIG. 3 schematically illustrates a portion of the system structure of FIG. 1, namely a recording module and related components.

In reference to FIG. 3, data and information sent to the recording module 220 from the distribution module 170 can consist of visual data components 310 and audio data components 300. Visual data components 310 includes the visual data presentation 160 defined by the presentation formatting module 150 and additional visual data components added in by users during collaboration sessions such as, for example, whiteboard drawing overlays 320 on top of the visual data presentation 160 and text communications 330 added by users during collaboration sessions such as interactive chats. Audio data components 300 such as, for example, voice communication from collaboration sessions are handled separately as an additional audio data channel as illustrated in FIG. 3.

The rendering component 340 brings together the visual data presentation 160, visual data components 310 added in by users during collaboration sessions 320, and text communications added by users during collaboration sessions 330 into one consistent video rendering in a similar way as described herein with regard to the visual display presentation 160. Such a consistent video rendering is arranged so that it can be displayed on hardware such as a video wall, a personal computer, or a mobile device in the future in an on-demand basis. Thus, this results in video data from collaboration sessions 345 being formatted in a consistent manner and includes the visual data presentation 160 and whiteboard drawing overlays 320 and text communication 330 added during the collaboration sessions. In one embodiment, the rendering component module 340 comprises a computing device, a software program, a data store, or multiples thereof or combinations thereof.

This video data 345 from rendering component 340 is captured by a dedicated capturing component 350 and formatted in a synchronized data format together with audio data components 300 such as voice communication captured during collaboration sessions. All the video and audio data and information gathered by the rendering component 340 and subsequently captured by the capturing component 350 can be archived in a storage component 360 to be recalled on demand as required. Such data and information can be stored in a form of specialized indexed computer files or captured video streams and stored in the storage component 360.

The recording module 220 further includes a playback distribution component 370 that, upon demand, retrieves data and information from the storage component 360 and makes it available via a data stream 380 to users via a variety of end points such as personal computers, mobile devices, and video walls. The standards of the data stream 380 for distributing the recorded session can vary from proprietary file format to industry standard file encoding such as H.265, mpeg, and the like. In some embodiments, the capturing component 350, the storage component 360, and the playback distribution component 370 can be a separate module and implemented externally by specialized video capture recording systems. In various embodiment, the capturing component 350, storage component 360, and playback distribution component 370, can each comprise a computing device, a software program, a data store, or multiples thereof or combinations thereof.

An example of the novel system and method in operation is described in the context of a network-operations center losing network connectivity due to fire. The critical incident results in a monitoring system generating a high-level alert and alert information in response to the loss of network connectivity. The alert information, in the form of an alert information packet, is sent to the mapping module. The mapping module standardizes the alert information packet and sends queries to accessible data systems arranged to retrieve additional relevant data and information, including visual information, regarding the critical incident. In this instance, this visual information can include relevant network performance dashboards from different monitoring applications, surveillance video camera feeds of the facility where the critical incident occurred, and even local news broadcasts if relevant to the critical incident. The data and information is mapped to its source and organized and formatted into a visual data presentation suitable for distribution to display devices at multiple end-points accessible to response team members regardless of the location of any member. A distribution module then sends the visual data presentation to the various end-points. The response team views the information and in real-time collaborates using voice communications, texts, whiteboarding, and other collaboration tools to addresses and resolve the critical incident. The information and data for the critical incident along with the activities of the response team is recorded for the purposes of post-incident analysis and training.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A computer-readable storage medium storing instructions which, when executed by one or more processors, cause performance of operations for automating the collection, aggregation, distribution, and display of alert information, the operations comprising:
   receiving, in a mapping module, alert information from a monitoring system related to a critical incident for a computer, telecommunications, or electrical system;
   standardizing, in the mapping module, a format of the alert information;
   automatically searching, by a search component of the mapping module, accessible systems and databases for relevant information for the critical incident;

retrieving, by the search component, such relevant information;

aggregating, by an aggregating component of the mapping module, the alert information and relevant information into a persistent arrangement that maps each of the alert information and relevant information to a respective source of the information;

formatting, by a presentation formatting module, the persistent arrangement into a visual data presentation for display across multiple display devices;

distributing, by a distribution module, the visual data presentation to one or more endpoints; and displaying, on one or more display devices, the visual data presentation at the one or more end-points.

2. The computer-readable storage medium of claim 1, wherein the operations further comprise:

storing, in a visual sources storage component of the mapping module, the persistent arrangement that maps the alert information and relevant information to the source of the information.

3. The computer-readable storage medium of claim 2, wherein the operations further comprise:

sending, from the visual sources storage component to the presentation formatting module, the persistent arrangement that maps the alert information and relevant information to the source of the information.

4. The computer-readable storage medium of claim 1, wherein the one or more display devices includes a video wall display with a display node configured to receive and display the visual data presentation.

5. The computer-readable storage medium of claim 4, wherein the at least one display device includes a computer configured to receive and display the visual data presentation.

6. The computer-readable storage medium of claim 5, wherein the at least one display device includes a mobile device configured to receive and display the visual data presentation.

7. The computer-readable storage medium of claim 6, wherein the operations further comprise:

modifying and adding content to the alert information and relevant data via collaboration tools.

8. The computer-readable storage medium of claim 7, wherein the operations further comprise:

receiving, rendering, capturing, storing, and selectively playing back, in a recording module, the visual data presentation, and additional visual content and additional audio content added or modified using the collaboration tools.

9. The computer-readable storage medium of claim 8, wherein:

the additional visual content includes at least one of a whiteboard drawing overlay on top of the visual data presentation or a text communication; and the audio content includes at least one of a voice communication.

10. The computer-readable storage medium of claim 8, wherein the operations further comprise:

rendering, in a rendering component of the recording module, the visual data presentation and additional visual content into a consistent video rendering.

11. The computer-readable storage medium of claim 10, wherein the operations further comprise:

capturing, in a capturing component of the recording module, the consistent video rendering arranged by the rendering component;

capturing, in the capturing component of the recording module, the audio content; and formatting, in the capturing component of the recording module, the video rendering and audio rendering into a synchronized data format.

12. The computer-readable storage medium of claim 11, wherein the operations further comprise:

storing, in a storage component of the recording module, the video rendering and audio rendering in the synchronized data format.

13. The computer-readable storage medium of claim 12, wherein the video rendering and audio rendering is indexed by its respective critical incident.

14. The computer-readable storage medium of claim 12, wherein the operations further comprise:

retrieving upon demand, by a playback distribution component of the recording module, the video rendering and audio rendering in the synchronized data format from the storage component; and playing back upon demand, by the playback distribution component of the recording module, the video rendering and audio rendering in the synchronized data format to one or more end-points.

15. The computer-readable storage medium of claim 14, wherein such retrieval and playback of the video rendering and audio rendering in the synchronized data format is facilitated by a user request.

16. The computer-readable storage medium of claim 1, wherein the operations further comprise:

accessing, by the search component, external databases configured to search for information relevant to the critical incident.

17. The computer-readable storage medium of claim 1, wherein the visual data presentation is arranged with a defined overall pixel space.

18. The computer-readable storage medium of claim 1, wherein the visual data presentation is configured to be interacted with through collaborative tools and shared with third parties, and wherein the operations further comprise:

identifying and indexing, in the recording module, the visual data presentation as visual data of a single critical incident.

19. The computer-readable storage medium of claim 1, wherein the visual data presentation includes at least one of the following: graphical data, a dashboard, tabular data, a video stream from surveillance cameras, a news repost, a weather broadcast, geographic information, a photograph, a video clip, a webpage, or a social media post.

20. The computer-readable storage medium of claim 1, wherein the operations further comprise:

receiving, by multiple plugin components of the mapping module, critical incidents from multiple monitoring systems.

* * * * *